(12) United States Patent
Cunha et al.

(10) Patent No.: US 8,139,650 B2
(45) Date of Patent: Mar. 20, 2012

(54) FAST NOISE REDUCTION IN DIGITAL IMAGES AND VIDEO

(75) Inventors: Alexandre L. Cunha, Pasadena, CA (US); Jerome B. Darbon, Los Angeles, CA (US)

(73) Assignee: California Institute of Technology, Pasadena, CA (US)

( * ) Notice: Subject to any disclaimer, the term of this patent is extended or adjusted under 35 U.S.C. 154(b) by 456 days.

(21) Appl. No.: 12/537,954

(22) Filed: Aug. 7, 2009

(65) Prior Publication Data

US 2010/0034296 A1 Feb. 11, 2010

Related U.S. Application Data

(60) Provisional application No. 61/188,225, filed on Aug. 7, 2008.

(51) Int. Cl.
*H04N 7/12* (2006.01)
*G06K 9/46* (2006.01)

(52) U.S. Cl. .................. 375/240.29; 382/240

(58) Field of Classification Search .................. 382/240, 382/251, 128, 232, 233; 375/240.01–240.29
See application file for complete search history.

(56) References Cited

U.S. PATENT DOCUMENTS

| | | | |
|---|---|---|---|
| 2004/0133927 A1* | 7/2004 | Sternberg et al. | 725/136 |
| 2005/0100102 A1* | 5/2005 | Gazdzinski et al. | 375/242 |
| 2007/0053620 A1* | 3/2007 | Mizuno | 384/240 |
| 2009/0164213 A1* | 6/2009 | Lennington et al. | 704/231 |

OTHER PUBLICATIONS

Briegel, A., D. P. Dias, Z. Li, R. B. Jensen, A. S. Frangakis, and G. J. Jensen, Multiple large filament bundles observed in *Caulobacter crescentus* by electron cryotomography, Molecular Microbiology, Oct. 2006, pp. 5-14, vol. 62, No. 1, Wiley/Blackwell Publishing.

Buades, A., B. Coll, and J. M. Morel, A review of denoising algorithms, with a new one, Journal of Multiscale Modeling and Simulation, Jul. 2005, pp. 490-530, vol. 4, No. 2, Society for Industrial and Applied Mathematics, Philadelphia, PA.

Coupé, P., P. Yger, and C. Barillot, Fast non local means denoising for 3D MR images, 9th Int'l Conf. on Medical Image Computing and Computer-Assisted Intervention, Oct. 2006, R. Larsen, M. Nielsen, J. Sporring (eds.), Lecture Notes in Comp. Science, pp. 33-40, vol. 4191, Copenhagen, Denmark.

Dabov, K., A. Foi, V. Katkovnik, and K. Egiazarian, Image denoising by sparse 3D transform-domain collaborative filtering, IEEE Trans. on Image Processing, Aug. 2007, pp. 2080-2095, vol. 16, No. 8, IEEE Signal Processing Society.

Gilboa, G., and S. Osher, Nonlocal operators with applications to image processing, Tech. Rprt. CAM-23, UCLA, 2007.

(Continued)

*Primary Examiner* — Behrooz Senfi
(74) *Attorney, Agent, or Firm* — Lyon & Harr, LLP; Richard T. Lyon

(57) ABSTRACT

Presented are embodiments for nonlocal mean filtering that provide a robust and efficient method for reducing noise in digital images and video frames. These embodiments build on a separable property of neighborhood filtering to offer a fast, parallel and vectorized implementation in contemporary shared memory computer architectures while minimizing theoretical computational complexity. In practice, this approach is fast and scales linearly with image size.

20 Claims, 2 Drawing Sheets

OTHER PUBLICATIONS

Huang, T., G. Yang, and G. Tang, A fast two-dimensional median filtering algorithm, IEEE Transactions on Acoustics, Speech and Signal Processing, Feb. 1979, pp. 13-18, vol. 27, No. 1, IEEE Signal Processing Society.

Jiang, W., M. L. Baker, Q. Wu, C. Bajaj, and W. Chiu, Applications of a bilateral denoising filter in biological electron microscopy, Journal of Structural Biology, Sep. 2003, pp. 114-122, vol. 144, Elsevier Inc.

Mahmoudi, M., and G. Sapiro, Fast image and video denoising via non-local means of similar neighborhoods, IEEE Signal Processing Letters, Dec. 2005, pp. 839-842, vol. 12, No. 12, IEEE Signal Processing Society.

Pantelic, R. S., G. Ericksson, N. Hamilton, and B. Hankamer, Bilateral edge filter: Photometrically weighted, discontinuity based edge detection, Journal of Structural Biology, Oct. 2007, pp. 93-102, vol. 160, No. 1, Elsevier Inc.

* cited by examiner

FAST NOISE REDUCTION IN DIGITAL IMAGES AND VIDEO

The U.S. government has certain rights in this invention pursuant to Grant Number N00014-07-1-0810 awarded by the Office of Naval Research.

BACKGROUND

Filtering digital images and video frames to reduce noise without destroying textures and fine structures depicted therein is often a de facto component of the image processing for many applications. One example of such an application, but by no means the only example, is in the field of electron cryomicroscopy.

Electron cryomicroscopy is a remarkable technology enabling new discoveries at sub-cellular scale. Studies at such scale aim to understand the structure and function of the macromolecular machinery responsible for regulating cell mechanisms with the ultimate goal of transforming living cells to attain desired configurations and perform specific tasks, such as, cure diseases and transform plants into fuel.

Researchers rely on pictures of samples maintained at cryo (freezing) temperatures to investigate a particular cell type in its near native state. A picture of a cell is formed after a beam of electrons is projected through the sample and captured by a charged-coupled device (CCD) camera. Due to a low dosage of electrons, necessary to avoid damaging the thin biological sample, a poorly resolved, noisy, low contrast image is formed. In the case of cryotomography, a series of unfiltered 2D projections are combined to build a 3D reconstruction of the cell. In this process, noise is transferred to the reconstructed object.

SUMMARY

Embodiments described herein generally provide for the filtering of digital images and video frames to reducing noise without removing textures and fine structures depicted therein. More particularly, embodiments of a nonlocal means filter (NL-means filter for short), are described which provide robust and efficient noise reduction.

In addition, because the nonlocal mean filtering embodiments described herein scale linearly with image size, it is possible to handle large, high resolution (HR) images. These large HR images are becoming the rule, and the trend is to continue increasing the CCD resolution to obtain images with even higher levels of detail. It is noted that current cameras can generate images having up to 40962 pixels, and this will be increasing. Yet another advantage is that the efficiency of the filtering permits practitioners to execute trial and error runs at an affordable pace enabling a prompt progress of their ultimate investigations. For example consider the task of picturing frozen cells as described earlier. The efficient and fast implementation of the nonlocal mean filtering embodiments described herein, allows and encourages practitioners to quickly test different denoising scenarios and make choices satisfying their own quality criteria.

In one general embodiment, reducing noise in a digital image or video frame, includes using a computing device to perform the following actions for each of a prescribed sequence of shift positions and for each of a prescribed set of sites in the digital image or video frame at each shift position. First, a squared difference value is computed. This represents the squared difference between the values of the sites associated with corresponding site locations in prescribed-sized patches centered respectively on the site under consideration and a site location that the site under consideration would occupy if shifted in accordance with a currently shift position. Next, a prefix sum value is computed based on the squared difference value, and a weight factor is computed using prefix sums. This factor represents the application of a prescribed function to prefix sum values associated with sites in a prescribed-sized patch centered on the site under consideration. A current denoised site value is next. This value represents the application of the weight factor last computed for the site under consideration to a value originally assigned to a site in the digital image or video frame which the site under consideration would occupy if shifted in accordance with the current shift position, and then adding the result to the denoised site value currently assigned to the site under consideration. It is noted that the denoised site value of a site is initially set to zero.

Once a denoised site value has been computed for each site at the last shift position, a normalizing weighting factor computed for each of the sites is respectively applied to the last computed denoised value of the site. In one implementation this involves first assigning a maximum weight value to each site. The maximum weight value assigned to a site represents the largest of the weight factors computed for the site. In addition, a normalization factor value is computed for each site. This normalization factor value represents the sum of the weight factors computed for a site. Then, for each of the prescribed set of sites in the digital image or video frame, the product of an original value assigned to the site under consideration and the maximum weight value of the site, is added to the last denoised value assigned to the site. The resulting denoised value of each site is then divided by the sum of the last computed normalization factor value and the last assigned maximum weight value for the site. The result of this last computation is designated as the final denoised value for the site.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
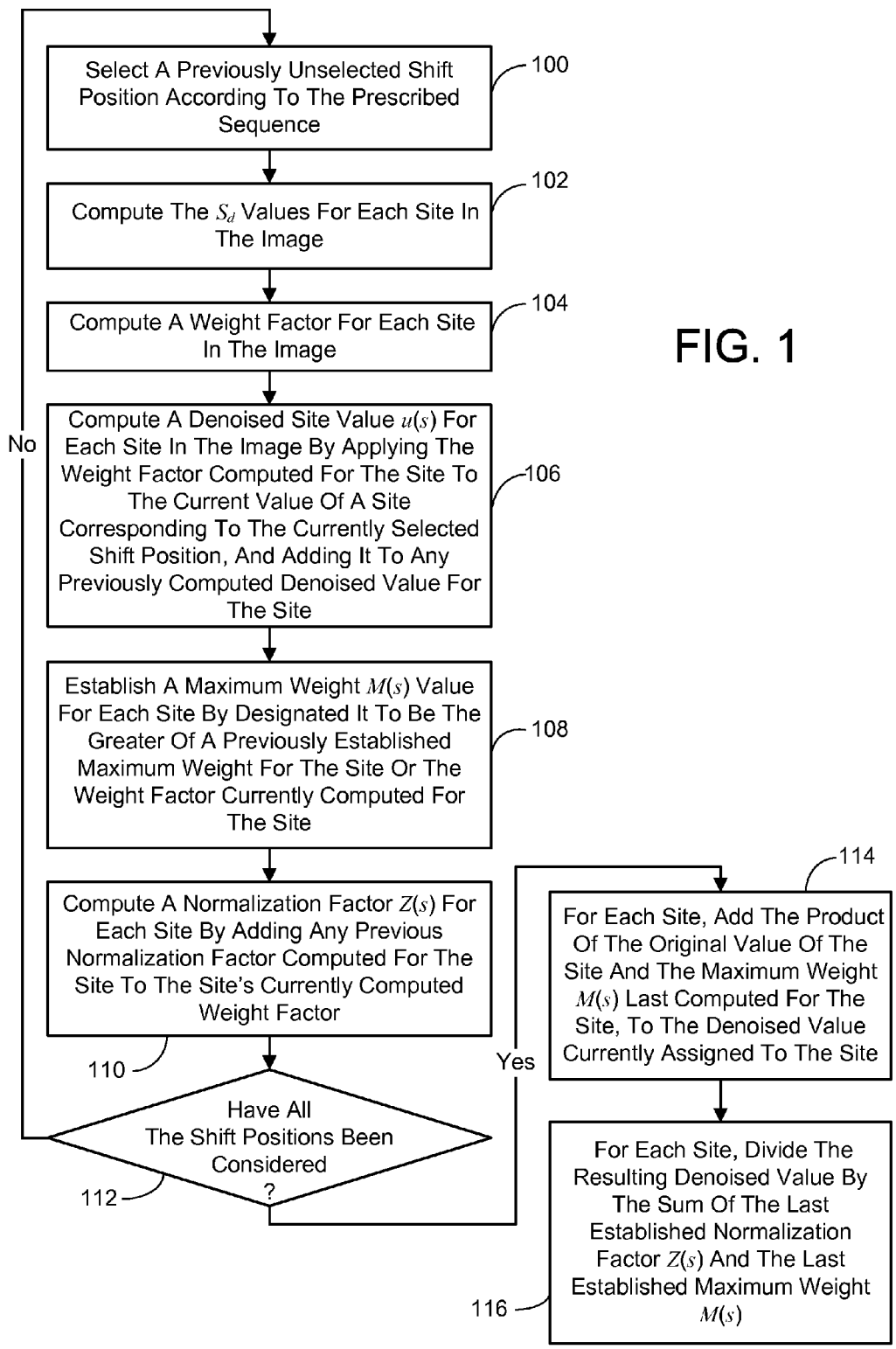
FIG. 1 is a flow diagram generally outlining one embodiment of a process for nonlocal mean filtering.

In the following description of embodiments for nonlocal means filtering, reference is made to the accompanying drawings which form a part hereof, and which are shown for the purposes of illustrating the described embodiments. It is understood that other embodiments may be utilized and structural changes may be made without departing from the scope of the invention.

1.0 Nonlocal Means Filtering

The nonlocal mean filtering embodiments described herein provide a robust and efficient method for reducing noise in digital images and video frames. These embodiments build on a separable property of neighborhood filtering to offer a fast, parallel and vectorized implementation in contemporary shared memory computer architectures while minimizing theoretical computational complexity. In practice, this approach is fast and scales linearly with image size.

The nonlocal mean filtering embodiments described herein have many advantages. For example, these filtering embodiments are particularly effective in reducing noise in digital images and video frames exhibiting relatively high amounts of noise, far beyond what is commonly found in regular photography. The previously described cryoimages are one example of such images, where a signal to noise ratio of 1.0 or lower is not uncommon.

1.1 The Nonlocal Means Approach

The NL-means scheme thrives when an image contains many repetitive structured patterns. It uses redundant information to reduce noise by performing a weighted average of pixel values. Formally, it is assumed images are defined over a discrete regular grid $\Omega$ of dimension d and cardinality $|\Omega|$. Let the original noisy image be denoted by v. The value of the restored image u at a site $s \in \Omega$ is defined as the convex combination $$u(s) = \frac{1}{Z(s)} \sum_{t \in N(s)} w(s, t) v(t), \quad (1)$$

where $w(\cdot, \cdot)$ are non-negative weights, $Z(s)$ is a normalization constant such that for any site s, $Z(s) = \sum_{t \in \mathcal{N}(s)} w(s,t)$, and $N(s)$ corresponds to a set of neighboring sites of s and can be referred to as the searching window. It is noted that in one embodiment, the sites s and t correspond to pixel locations.

The weight $w(s, t)$ measures the similarity between two square patches centered, respectively, at sites s and t, and it is defined as follows:

$$w(s, t) = g_h\left(\sum_{\delta \in \Delta} G_\sigma(\delta)(v(s+\delta) - v(t+\delta))^2\right), \quad (2)$$

where $G_\sigma$ is a Gaussian kernel of variance $\sigma^2$, $g_h$ is a continuous non-increasing function with $g_h(0)=1$ and $\lim_{x \to +\infty} g_h(x) = 0$, and $\Delta$ represents the discrete patch region containing the neighboring sites $\delta$. The constant parameter value h is used to control the amount of filtering. In one embodiment, the value of h is determined empirically. Typically, h will range between about 1.0 and 6.0. Examples of the $g_h$ function are $$g_h(r) = \frac{1}{1 + (r^2/h^2)} \quad \text{and}$$

$g_h(r) = e^{-r^2/h^2}$ where r is a function parameter. In one embodiment, the former is adopted as it can lead to a more efficient implementation.

Thus, NL-means denoises an image by performing a weighted average of site values taking into account spatial and intensity similarities between sites. Similarity is computed between equally sized patches as they capture the local structures (geometry and texture) around the sites under consideration. Note that sites outside $\mathcal{N}(s)$ do not contribute to the value of u(s). This property allows separating the image into independent disjoint pieces and processing them in parallel.

Searching windows N and patches $\Delta$ have uniform cardinalities of, respectively, $(2K+1)^d$ and $(2P+1)^d$ with $\mathcal{N}=[-K, K]^d$ and $\Delta=[-P, P]^d$. Using equations (1) and (2), one realizes the nonlocal mean algorithm having $O(|\Omega|K^d P^d)$ for time complexity. Note that this complexity is exponential with respect to space dimension d but it is polynomial with respect to the number of pixels $|\Omega|$. In practice, where dimensions are fixed, the algorithm remains polynomial.

Theoretically, to make averaging more robust, one would like to set the searching window $\mathcal{N}(\cdot)$ as large as possible and in the limit extend it to the entire image. However, this would lead to excessively long computation times and thus searching is constrained to local neighborhoods.

1.2 Fast, Efficient Nonlocal Means Filtering

In one embodiment of the nonlocal mean filtering described herein, a process for efficiently computing the weights w(s, t) of Eq. (2) is employed. The weight computation is by far the most time consuming part when generating the restored image u. Thus, reducing the time it takes to compute the weights advantageously speeds up the entire denoising process. The process will first be described in the context of 1-dimensional images. Under this 1D assumption, $\Omega=[0, n-1]$, for an image having n sites.

Given a translation vector $d_x$, a new image $S_{d_x}$ is introduced as:

$$S_{d_x}(p) = \sum_{k=0}^{p} (v(k) - v(k+d_x))^2, \quad p \in \Omega. \quad (3)$$

$S_{d_x}$ corresponds to the discrete integration of the squared difference of the image v and its translation by $d_x$. This integration results in a prefix sum image being created in which each site in raster order has a value that is the sum of the values of all the sites that precede it. For a 1D image, the prefix sum image is computed just as described (there is only one row in a 1D image and thus only one prefix sum line to compute). In 2D, the prefix sum is first computed for each row of the squared difference image (a 2D image can be viewed as a collection of 1D images, one for each row or one for each column). A second prefix sum computation is then performed on the result, this time scanning in a column-wise manner. This produces the prefix sum image for the entire 2D image. It is noted that one can transpose the rows by columns of the image and this procedure yields the same result.

Note that Eq. (3) may require access to sites outside the image domain if the site s is near an edge of the image being denoised. To avoid memory corruption, the image boundaries are extended, by for example, but without limitation, symmetry or in a periodic fashion. Thus, the digital image or video frame is expanded outwards such that the aforementioned neighborhood when centered on a site at the edge of the unexpanded digital image or video frame has site values assigned to each site within the neighborhood.

In regard to computing the aforementioned weights, the Gaussian kernel of Eq. (2) can be removed without noticeable differences. In addition, recall that 1D patches take the form $\Delta=[-P,P]$. Thus, Eq. (2) can be rewritten as follows:

$$w(s,t) = g_h(\Sigma_{\delta_x \in \Delta}(v(s+\delta_x) - v(t+\delta_x))^2)$$

Now let $d_x=(t-s)$ and define $\hat{p}s+\delta_x$. With this, re-parameterization w(s, t) can be rewritten as:

$$w(s, t) = g_h\left(\sum_{\hat{p}=s-P}^{s+P}(v(\hat{p}) - v(\hat{p}+d_x))^2\right)$$

If the sum is split and the identity in Eq. (3) used, then:

$$w(s) = g_h(S_{d_x}(s+P) - S_{d_x}(s-P)), \quad (4)$$

which is independent of t provided the quantity $S_{d_x}$ is known. This represents using the prefix sum value $S_{d_x}$ at site locations (s+P) and (s+P) to compute the weight for a site in the in the image being denoised. Thus in this 1D case, computing the weight at a site for a given shift requires only two values of the prefix sum image. As such, Eq. (4) advantageously allows the weight for a pair of sites to be computed in constant time.

Generalizing to higher dimensions corresponds to have integrations along the image orthogonal axes in Eq. (3). It is not difficult to see that this approach yields a weight computation formula requiring $O(2^d)$ operations for d-dimensional images. This quantity is also advantageously independent of the size of the patches.

Given the foregoing, nonlocal means filtering can be implemented in one embodiment as follows. First, all values $S_{d_x}$ are computed using Eq. (3); then weights are computed using Eq. (4); and finally the filtering is performed using Eq. (1), with the w(s) of Eq. (4) substituting for the w(s,t) of Eq. (1). This procedure is repeated for all possible translations given by the dimensions of $\mathcal{N}$.

The foregoing can be expanded into 2D filtering by replacing Eqs. (3) and (4) with the following equations. In the case of 2D filtering Eq. (3) is replaced with:

$$S_d(p) = S_d(p_x, p_y) = \sum_{k=0}^{p_x}\sum_{l=0}^{p_y}(v(k, l) - v(k+d_x, l+d_y))^2 \quad (5)$$

where $p=(p_x, p_y)$ is a site in two dimensions and $d=(d_x, d_y)$ is a translation in two dimensions.

In the case of 2D filtering Eq. (4) is replaced with:

$$w(s_x, s_y) = g_h\left(\begin{array}{l}S_d(s_x-P, s_y-P) + S_d(s_x+P, s_y+P) - \\ S_d(s_x-P, s_y+P) - S_d(s_x+P, s_y-P)\end{array}\right) \quad (6)$$

where $S=(S_x, S_y)$ is a site in two dimensions x and y, and 2P+1 is the width and height of the prescribed-sized patch centered on site s (as stated earlier).

Note that the "x" subscript has been dropped in d and $S_d$ to indicate its applicability to either 1D or 2D cases. Also note that for the 2D case, the computation of the weight at a site uses only four values of the 2D prefix sum image corresponding to the locations specified in Eq. (6). This compares to recalling and summing what could be hundreds of squared difference values, depending on the size of the patches and search window.

It is further noted that Eq. (1) ignores the contribution of the site being denoised since $\mathcal{N}(s)$ corresponds only to the neighboring sites of s. In one embodiment of the nonlocal mean filtering described herein, the contribution of the site under consideration is accounted for in determining the denoised image value of s. This is generally accomplished by applying a prescribed weighting factor to the original value of the site under consideration (i.e., v(s)) and adding it to the summation in Eq. (1). Doing this requires that the prescribed weighting factor also be added to the normalization term Z(s). Thus, Eq. (1) is rewritten as:

$$u(s) = \frac{1}{Z(s)}\left(\left(\sum_{t\in N(s)}w(t)v(t)\right) + (M(s)v(s))\right) \quad (7)$$

where the normalization term is now defined as $Z(s) = (\Sigma_{t\in\mathcal{N}(s)}w(t)) + M(s)$ and M(s) is a prescribed weighting factor for the site being denoised. In one version, M(s) is designated to be the maximum weight among the weights computed for the neighboring sites (i.e., t) of the site being denoised (i.e., s).

Referring to FIG. 1, an exemplary implementation of the foregoing nonlocal mean filtering will now be described. First, a previously unselected shift position based on a prescribed denoising neighborhood size is selected according to a prescribed sequence (100). For example, the prescribed selection sequence for a 1D case can be sequential starting with the left-most site and moving right. Thus, if it is assumed the aforementioned neighborhood parameter K=7 (corresponding to a neighborhood width distance of 15 sites), the first shift would be −7, the second shift would be −6, and so on to the last shift of +7. For a 2D case, the prescribed sequence can be in raster order and based on the size of a prescribed neighborhood. More particularly, the first shift position would correspond to the upper left hand corner of the prescribed neighborhood when centered on the site under consideration. The shift would then follow in raster order to the last shift position, which corresponds to the lower right hand corner of the prescribed neighborhood when centered on the site under consideration. Thus, if it is assumed the aforementioned neighborhood size is 15×15 sites, the first shift would be up 7 sites and to the left by 7 sites, and each subsequent shift would follow a raster pattern until the last shift which would be down seven sites and to the right by 7 sites.

Next, the $S_d$ values are computed for each site in the image being denoised (102). In one implementation this involves computing the squared difference between the values of the sites associated with corresponding site locations in prescribed-sized patches centered respectively on the site under consideration (i.e., s) and a site location that the site under consideration would occupy if shifted in accordance with the currently selected shift position (i.e., t), and then computing the prefix sum values for these site. Eqs. (3) and (5) describe one way of characterizing this task for the 1D and 2D cases respectively.

A weight factor is then computed for each site (104). In general, the weight factor is computed by applying a prescribed function (such as $g_h$ described previously) to particular $S_d$ values associated with sites in the prescribed sized patch centered on the site under consideration. The particular $S_d$ values employed differ between the 1D and 2D cases. In one implementation of the 1D case, the $S_d$ value corresponding to the site at the far left hand side of the patch centered on the site under consideration is subtracted from the $S_d$ value corresponding to the site at the far right hand side of patch centered on the site under consideration. In one implementation of the 2D case, the $S_d$ values corresponding to the sites at the upper left hand corner of patch centered on the site under consideration and the lower right hand corner of patch centered on the site under consideration are subtracted from the sum of the $S_d$ values corresponding to the sites at the lower left hand corner of patch centered on the site under consideration and the upper right hand corner of patch centered on the site under consideration. Thus, if the $S_d$ value associated with the lower left hand corner is designated as "A", the $S_d$ value associated with the lower right hand corner is designated as "B", the $S_d$ value associated with the upper right hand corner is designated as "C", and the $S_d$ value associated with the upper left hand corner is designated as "D"; then the prescribed function is applied to the result of "A+C−D−B". Eqs. (4) and (6) describe one way of characterizing the foregoing weight factor computation task for the 1D and 2D cases respectively.

A denoised site value u(s) is computed next for each site in the image by summing to its current value (which is initially 0), the multiplication of the weight factor computed for the site under consideration for the selected shift and the value corresponding to the current shift in the original image (106). For example, if the current shift is equivalent to moving one site to the right, the weight factor is applied to the original image value of the site immediately to the right of the site under consideration to compute the denoised site value. In addition, a value of the aforementioned maximum weight M(s) is established for each site by designated it to be the greater of a previously established maximum weight for the site or the weight factor currently computed for the site (108). Further, a value of the aforementioned normalization factor Z(s) is established for each site by adding any previous normalization factor computed for the site to the currently computed weight factor of the site (110). It is then determined if all the shift positions have been considered (112). If not, then process actions 100 through 112 are repeated for the next shift position. Note that for each shift position processed, the denoised site value assigned to each site considered grows with the addition of a weighted value of the site corresponding to the currently selected shift position. In addition, at the end of the shifting, the maximum weight M(s) for each site s considered will be the largest weight computed for that site and Z(s) will be the sum of the weights computed for that site.

When in process action 112 it is determined there are no additional shift positions to consider, the process continues by, for each site, adding the product of the original value of that site v(s) and the maximum weight M(s) last computed for the site, to the denoised value currently assigned to the site (114). Then, the resulting denoised value is divided by the sum of the last established normalization factor Z(s) and the last established maximum weight M(s) (116). These last two actions add the contribution of each site's original value to the computation of the denoised value for that site.

An exemplary pseudo-code representation of the foregoing embodiment that includes the contribution of site s itself for the 1D case is as follows:

```
Input: v, K, P, h
Output: u
Temporary variables: images S_d, Z, M
Initialize u, M and Z to 0
for all d ∈ [−K, K] do
    Compute S_d using Eq. (3)
    for all s ∈ [0, n − 1] do
        compute weights w using Eq. (4)
        u(s) ← u(s) + w · v(s + d)
        M(s) = max(M(s), w)
        Z(s) ← Z(s) + w
    end for
end for
for all s ∈ [0, n − 1] do
    u(s) ← u(s) + M(s) · v(s)
```

$$u(s) \leftarrow \frac{u(s)}{Z(s) + M(s)}$$

```
end for
return u
```

An exemplary pseudo-code representation of the foregoing embodiment that includes the contribution of site s itself for the 2D case would track the 1D code with the exception that the shifts d would be in raster order as described previously, and Eqs. (5) and (6) would be used instead of Eqs. (3) and (4) respectively.

1.3 Additional Time Saving Shortcuts

The nonlocal means filtering embodiments described herein provide a fast implementation that can employ additional time saving shortcuts exploiting such things as vectorization techniques and computing parallelism. These shortcuts will be described more fully in the sections to follow.

1.3.1 Image-Wide Difference Computations

A sliding search window method can be used to denoise parts of the image in sequence. However, this method requires the same operations to be repeated for each part. If parts of the computations are performed in an image-wide manner a time savings can be realized. Thus, in this image-wide embodiment, stages of the previously described denoising computations is performed across the entire image.

More particularly, an image-wide implementation of the nonlocal mean filtering includes employing a time saving shortcut to obtain the difference values needed to compute the $S_d$ values. This shortcut involves computing the difference between each corresponding site location in the image v and the shifted copy of the image, for each shift. For example, the prescribed shift pattern for a 1D case can be sequential starting with the left-most site and moving right. In the 2D case, the first shift position can correspond to a copy of the digital image or video frame being shifted so that its central site corresponds to the position of a site in the upper left hand corner of the prescribed neighborhood when centered on the central site of the original digital image or video frame. The shift would then follow in raster order to the last shift position, which corresponds to the copy of the digital image or video frame being shifted so that its central site corresponds to the position of a site in the lower right hand corner of the prescribed neighborhood when centered on the central site of the original digital image or video frame. The difference values computed for each shift are then used to compute an $S_d$ value for each site in the image as described previously. Note that each site will have a different $S_d$ value for each shift.

1.3.2 Vectorization

Since the noisy image and the shifted image will typically be represented as vectors in the memory of a computing device (such as the computing devices described in the Computing Environment section of this disclosure) used to implement the nonlocal means filtering, the foregoing difference computation can be accomplished via vector subtraction methods. These difference computations are then repeated for each possible shift position within the extent of the search window in a prescribed order (e.g., sequential order for the 1D case, and raster order for the 2D case) with the difference values obtained being appended in sequence onto an overall difference vector. The overall difference vector is then multiplied by itself to produce a squared difference vector. This squared difference vector converted to a prefix sum vector in which the value of each element is the sum of the values of all the elements that precede it. The prefix sum vector can then be used to compute $S_d$ as described previously.

It is noted that the use of the foregoing vectors to compute $S_d$ can be stored to the extent possible in the cache associated with the RAM in the computing device being used to implement the nonlocal means filtering. This takes full advantage of the quick retrieval capabilities of the cache and further speeds up the filtering computations. Besides, this implementation employs a contemporary Single Instruction Multiple Data (SIMD) instructions set and benefits from the adoption of the previously described prefix sum construct to efficiently build in a cache aware manner. Traversal of the signal is performed in a raster scan order, i.e., from left to right for a 1D signal, and from the first row to the last row, each pixel of a row being visited from left to right, for a 2D image. Using these traversals, computations described in this embodiment are done through SIMD instructions as opposed to scalar operations. It is mentioned that although usage of SIMD instructions and maximization of cache hits does not change the time complexity in a RAM model, they do drastically reduce the computational load of its implementation.

1.3.3 Computing Parallelism

The foregoing nonlocal mean formulations permit decomposing an image into disjoint parts, allowing for parallel denoising of the distinct image parts. Thus, the parallel processing capabilities of current computing devices can be exploited to save processing time. For example, duo core processors having shared memory are common in today's computing devices. In one embodiment of the nonlocal mean filtering, this dual processing feature is used to advantage by splitting the image being denoised into parts (e.g., in two parts when a dual core processor is employed). This division is done along a horizontal dividing line so as to maintain the raster sequencing of the resulting vectors used to represent each part of the image. The foregoing filtering methods are then performed independently on each part. It is noted that if more than two processors or processing units (such as multithreaded capabilities cores, i.e., a processor emulates a multiprocessor) are available in the computing device, the image can be split in a like number of ways (again along horizontal dividing lines). In regard to the size of the resulting image parts, if the number of rows of the digital image or video frame are divisible by the number of processing units, then the digital image or video frame is split into sections having the same size. However, if the number of rows of the digital image or video frame are not divisible by the number of processing units, then the digital image or video frame is split into as many sections of the same size as possible but with one having one more row than the other sections. For example, in this later case if the digital image or video frame has odd number of rows and is to be split into 4 parts—three of the resulting parts would have the same number of rows, with the fourth having one additional row in comparison to the others.

It is further noted that even though each image part is operated on independently, it is not necessary to extend the parts out from the dividing lines by generating site values using copy, symmetry, periodic means, or any other method that generates values for locations that did not previously exist in the overall image, as was done in the previously described procedures when s was near the edge. Rather, since the actual site values are available from adjoining image parts, these values are used to populate an extended portion out from the dividing line (or lines) of the image part.

Still further, some current processors include an intrinsic parallel processing feature that can be exploited via their instruction sets. In general, these include processors in shared memory computer architectures, such as Cell Broadband Engine Architecture or any AltiVec SIMD instructions based processor. For example, such processors may allow four calculations to be made simultaneously. Thus, by exploiting this feature to perform the previously described computations in parallel for sites within a search window, the processing speed can be increased even more.

2.0 The Computing Environment

A brief, general description of a suitable computing environment in which portions of the embodiments for nonlocal means filtering described herein may be implemented will now be described. These embodiments are operational with numerous general purpose or special purpose computing systems, environments or configurations. Exemplary well known computing systems, environments, and/or configurations that can be suitable include, but are not limited to, personal computers (PCs), server computers, hand-held or laptop devices, multiprocessor systems, microprocessor-based systems, set top boxes, programmable consumer electronics, network PCs, minicomputers, mainframe computers, distributed computing environments that include any of the aforementioned systems or devices, and the like. It is noted that these computing devices can employ multiple processing units (often referred to as cores) having a shared memory (e.g., a duo core processor which has two processing units). These multiple processing unit computing devices can be of particular advantage when implementing the embodiments for nonlocal means filtering described herein.

Figure 2:
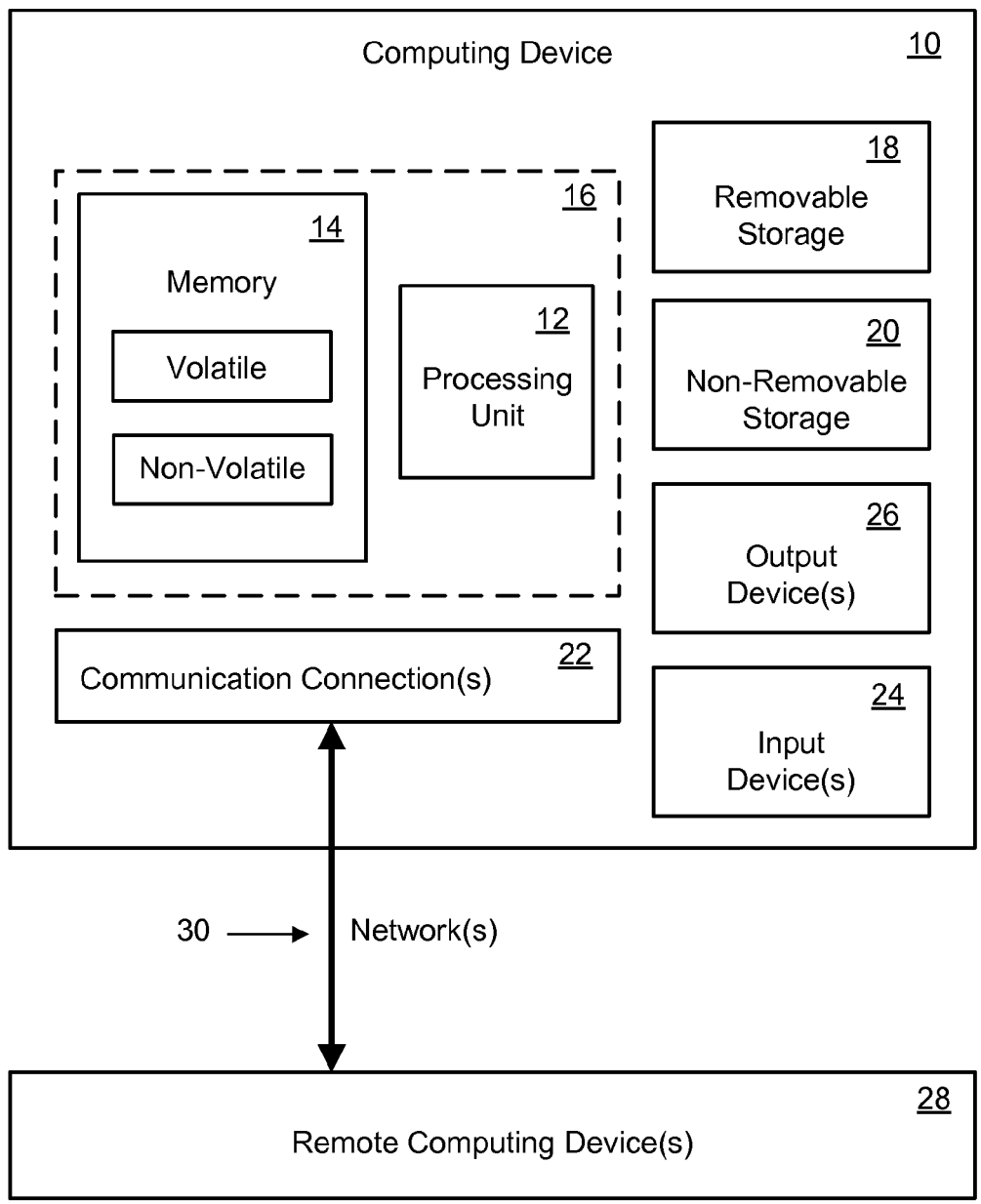
FIG. 2 is a diagram depicting a general purpose computing device constituting an exemplary system for implementing embodiments for nonlocal mean filtering that are described herein.

FIG. 2 illustrates an exemplary embodiment, in simplified form, of a suitable computing system environment. The environment illustrated in FIG. 2 is only one example of a suitable computing system environment and is not intended to suggest any limitation as to the scope of use or functionality of the embodiments for nonlocal means filtering described herein. Neither should the computing system environment be interpreted as having any dependency or requirement relating to any one or combination of components exemplified in FIG. 2. As exemplified in FIG. 2, a system for implementing portions of the embodiments for nonlocal means filtering described herein includes one or more computing devices, such as computing device 10. In its simplest configuration, computing device 10 typically includes at least one processing unit 12 and memory 14. Depending on the specific configuration and type of computing device, the memory 14 can be volatile (such as RAM), non-volatile (such as ROM and flash memory, among others) or some combination of the two. This simplest configuration is illustrated by dashed line 16. As exemplified in FIG. 2, computing device 10 can also have additional features and functionality. By way of example, computing device 10 can include additional storage such as removable storage 18 and/or non-removable storage 20. This additional storage includes, but is not limited to, magnetic disks, optical disks and tape. Computer storage media typically embodies volatile and non-volatile media, as well as removable and non-removable media implemented in any method or technology. The computer storage media provides for storage of various information needed to operate the device 10 such as computer readable instructions associated with an operating system, application programs and other program modules, and data structures, among other things. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical disk storage technology, magnetic cassettes, magnetic tape, magnetic disk storage or other magnetic storage devices, or any other physical medium which can be used to store the desired information and which can be accessed by computing device 10. Any such computer storage media can be part of computing device 10. The term "computer-readable storage medium" as used herein refers to the aforementioned storage media. As exemplified in FIG. 2, computing device 10 also includes a communications connection(s) 22 that allows the device to operate in a networked environment and communicate with a remote computing device(s), such as remote computing device(s) 28. Remote computing device(s) 28 can be a PC, a server, a router, a peer device, or other common network node, and typically includes many or all of the elements described herein relative to computing device 10. Communication between computing devices takes place over a network(s) 30, which provides a logical connection(s) between the computing devices. The logical connection(s) can include one or more different types of networks including, but not limited to, a local area network(s) (LAN) and wide area network(s) (WAN). Such networking environments are commonplace in conventional offices, enterprise-wide computer networks, intranets and the Internet. It will be appreciated that the communications connection(s) 22 and related network(s) 30 described herein are exemplary and other means of establishing communication between the computing devices can be used. As exemplified in FIG. 2, computing device 10 also includes an input device(s) 24 and output device(s) 26. Exemplary input devices 24 include, but are not limited to, a keyboard, a GUI selection device such as a mouse and the like, a pen, a touch input device, a microphone, and a camera, among others. A user can enter commands and various types of information into the computing device 10 through the input device(s) 24. Exemplary output devices 26 include, but are not limited to, a display device(s), a printer, and audio output devices, among others. The user can select items in a GUI displayed on a display device via the GUI selection device. These input and output devices are well known and need not be described at length here. Referring again to FIG. 2, the embodiments for nonlocal means filtering described herein can be further described in the general context of computer-executable instructions, such as program modules, which are executed by computing device 10. Generally, program modules include routines, programs, objects, components, and data structures, among other things, that perform particular tasks or implement particular abstract data types. The embodiments described herein can also be practiced in a distributed computing environment where tasks are performed by one or more remote computing devices 28 that are linked through a communications network 22/30. In a distributed computing environment, program modules can be located in both local and remote computer storage media including, but not limited to, memory 14 and storage devices 18/20.

3.0 Other Embodiments

It is noted that any or all of the aforementioned embodiments, implementations and versions throughout the description may be used in any combination desired to form additional hybrid embodiments, implementations and versions. For instance, one can use the aforementioned embodiments to compute the weights and store them. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for reducing noise in a digital image or video frame, comprising:
using a computing device to perform the following process actions:
for each of a prescribed sequence of shift positions and for each of a prescribed set of sites in the digital image or video frame at each shift position,
computing a squared difference value between the values of sites associated with corresponding site locations in prescribed-sized patches centered respectively on the site under consideration and a site location that the site under consideration would occupy if shifted in accordance with a currently shift position,
computing a prefix sum value based on the squared difference values,
computing a weight factor comprising applying a prescribed function to prefix sum values associated with sites in said prescribed-sized patch centered on the site under consideration, and
computing a current denoised site value comprising applying the weight factor last computed for the site under consideration to a value originally assigned to a site in the digital image or video frame which the site under consideration would occupy if shifted in accordance with a current shift position, and adding result of the computing to the denoised site value currently assigned to the site under consideration, wherein the denoised site value of a site is initially set to zero; and
for each of the prescribed set of sites in the digital image or video frame, applying a normalizing weighting factor computed for the site under consideration to the last computed denoised value of the site under consideration.

2. The process of claim 1, wherein the prescribed sequence of shift positions is in raster order and based on a size of a prescribed neighborhood, such that a first shift position for each site corresponds to an upper left hand corner of the prescribed neighborhood when centered on the site under consideration and a last shift position for each site corresponds to a lower right hand corner of the prescribed neighborhood when centered on the site under consideration.

3. The process of claim 1, further comprising performing a process action of expanding the digital image or video frame outwards such that said prescribed sized neighborhood centered on a site at an edge of the unexpanded digital image or video frame has site values assigned to each site within the neighborhood, prior to performing the process action of computing the squared difference value for the edge site.

4. The process of claim 1, wherein the process action of computing the prefix sum value for a site given the current shift position, comprises an action of using the equation $$\sum_{k=0}^{p_x} \sum_{l=0}^{p_y} (v(k,l) - v(k+d_x, l+d_y))^2$$

where $p=(p_x, p_y)$ is a site in two dimensions x and y, $d=(d_x, d_y)$ is a translation in said two dimensions and v is an image value originally assigned to the specified site in the digital image or video frame.

5. The process of claim 1, wherein the process action of computing the squared difference value for a site given the current shift position, comprises the actions of:

characterizing the digital image or video frame and a shifted copy thereof in separate vectors;

for each shift position and for each of the sites in the digital image or video frame at each shift position, computing said difference between the values of the sites associated with corresponding site locations in prescribed-sized patches centered respectively on the site under consideration and a site in a copy of the digital image or video frame which the site under consideration would occupy if said copy is shifted in accordance with the shift position under consideration using vector subtraction to produce a sequential part of a difference vector; and multiplying the difference vector once complete by itself to produce a squared difference vector.

6. The process of claim 5, further comprising the process action of storing the difference vector in a cache associated with a random access memory (RAM) of said computing device to the extent possible, so as to maximize recall speed.

7. The process of claim 5, wherein the process action of computing the prefix sum values for each site at each shift position, comprises the action of computing a prefix sum vector from the squared difference vector.

8. The process of claim 7, further comprising the process action of storing the prefix sum vector in a cache associated with a random access memory (RAM) of said computing device to the extent possible, so as to maximize recall speed.

9. The process of claim 1, wherein the process action of computing the weight factor, comprises the actions of:

designating the prefix sum value associated with a lower left hand corner of said prescribed sized neighborhood centered on the site under consideration as "A";

designating the prefix sum value associated with the lower right hand corner of said prescribed sized neighborhood centered on the site under consideration as "B";

designating the prefix sum value associated with an upper right hand corner of said prescribed sized neighborhood centered on the site under consideration as "C";

designating the prefix sum value associated with the upper left hand corner of said corresponding locations said prescribed sized neighborhood centered on the site under consideration as "D";

computing result of A+C−D−B; and applying the prescribed function $g_h$ to said result of A+C−D−B.

10. The process of claim 1, wherein the process action of computing the weight factor comprises an action of using the equation $$g_h\left(\begin{array}{l}S_d(s_x - P, s_y - P) + S_d(s_x + P, s_y + P) - \\ S_d(s_x - P, s_y + P) - S_d(s_x + P, s_y - P)\end{array}\right)$$

where $g_h$ is said prescribed function, $S=(S_x, S_y)$ is a site in two dimensions x and y, 2P+1 is the width and height of said prescribed-sized patch centered on the site under consideration and $S_d$ is an the prefix sum value assigned to the specified site.

11. The process of claim 10, wherein the prescribed function is defined by the equation $$g_h(r) = \frac{1}{1 + (r^2/h^2)},$$

wherein r is function parameter and h is a constant parameter value used to control the amount of filtering.

12. The process of claim 11, wherein the value of h ranges between about 1.0 and 6.0.

13. The process of claim 1, wherein said computing device comprises multiple processing units, and wherein prior to performing the process action of claim 1, performing the process actions of:

splitting said digital image or video frame along horizontal lines into separate sections, wherein number of sections created equals the number of processing units of the computing device; and allocating each section to a different processing unit;

wherein the process actions of claim 1 are performed by each of the processing units on the section of the digital image or video frame allocated thereto.

14. The process of claim 13, wherein the digital image or video frame is split into sections each of same size whenever the number of rows of the digital image or video frame are divisible by the number of processing units, and wherein the digital image or video frame is split into sections each of same size or having one more row than the other sections whenever the number of rows of the digital image or video frame are not divisible by the number of processing units.

15. The process of claim 13, further comprising performing a process action of expanding each digital image or video frame section outwards such that said prescribed sized neighborhood centered on a site at an edge of an unexpanded digital image or video frame section has site values assigned to each site within the neighborhood, prior to performing the process action of computing the squared difference value for the edge site.

16. The process of claim 15, wherein the process action of expanding each digital image or video frame section outwards, comprises an action of, for each edge of each section created by splitting the original digital image or video frame, expanding said edges by assigning to newly created sites, the values associated with the corresponding sites in the section that was adjacent to the edge being expanded prior to said splitting.

17. The process of claim 1, wherein said computing device comprises at least one processor comprising an intrinsic parallel processing capability that is exploitable to perform multiple simultaneous operations, and wherein the process actions of computing a squared difference value, computing a prefix sum value, computing a weight factor and computing a current denoised site value for each site at each shift position, comprises simultaneously performing as many of said computations as possible given the intrinsic parallel processing capability of the processor.

18. The process of claim 1, further comprising performing, after the performance of the process action of computing a weight factor, the process actions of:

for each of the prescribed sequence of shift positions and for each of the prescribed set of sites in the digital image or video frame at each shift position, assigning a current maximum weight value to the site under consideration comprising a greater of a last previously assigned maximum weight value for the site under consideration and the weight factor last computed for the site under consideration, wherein the maximum weight value of a site is initially set to zero, and computing a current normalization factor value for the site under consideration comprising the sum of a normalization factor last computed for the site under consideration and the weight factor last computed for the site under consideration, wherein the normalization factor value of a site is initially set to zero.

19. The process action of claim 18, wherein the process action of applying the normalizing weighting factor computed for the site under consideration to the last computed denoised value of the site under consideration for each of the prescribed set of sites in the digital image or video frame, comprises the actions of:

for each of the prescribed set of sites in the digital image or video frame, adding the product of an original value assigned to the site under consideration and the maximum weight value last computed for the site under consideration, to the denoised value currently assigned to the site under consideration, and dividing the resulting last computed denoised value of the site under consideration by the sum of the last computed normalization factor value and the last assigned maximum weight value for the site under consideration.

20. The process of claim 1, wherein said digital image or video frame is a cyroimage exhibiting a signal to noise ratio of 1.0 or lower and repetitive structured patterns.

* * * * *

UNITED STATES PATENT AND TRADEMARK OFFICE
CERTIFICATE OF CORRECTION

PATENT NO. : 8,139,650 B2
APPLICATION NO. : 12/537954
DATED : March 20, 2012
INVENTOR(S) : Alexandre L. Cunha and Jerome B. Darbon Page 1 of 1

It is certified that error appears in the above-identified patent and that said Letters Patent is hereby corrected as shown below:

Column 3, line 34, the formula should appear as follows:

$$Z(s) = \sum_{t \in N(s)} w(s,t)$$

Column 5, line 1, the second formula: "$\hat{p}s + \delta_x$" should be changed to: -- $\hat{p} = s + \delta_x$ --

Column 5, line 51, the formula: "$S=(S_x, S_y)$" should be changed to: -- $s=(s_x, s_y)$ --

Column 6, line 12-13, the formula should appear as follows:

$$Z(s) = \left( \sum_{t \in N(s)} w(t) \right) + M(s)$$

Column 13, line 55, the formula: "$S=(S_x, S_y)$" should be changed to: -- $s=(s_x, s_y)$ --

Signed and Sealed this
Eighth Day of May, 2012

David J. Kappos
*Director of the United States Patent and Trademark Office*

UNITED STATES PATENT AND TRADEMARK OFFICE
CERTIFICATE OF CORRECTION

PATENT NO. : 8,139,650 B2  
APPLICATION NO. : 12/537954  
DATED : March 20, 2012  
INVENTOR(S) : Alexandre Cunha and Jeremy Darbon Page 1 of 1

It is certified that error appears in the above-identified patent and that said Letters Patent is hereby corrected as shown below:

Title Page,

Item (73), Assignee, insert --The Regents of the University of California, Oakland, CA (US)--

Signed and Sealed this
Twelfth Day of November, 2013

Teresa Stanek Rea
*Deputy Director of the United States Patent and Trademark Office*